United States Patent [19]

Brown et al.

[11] Patent Number: 4,904,746

[45] Date of Patent: Feb. 27, 1990

[54] PREPARATION OF LINEAR POLYESTER-POLYEPOXIDE REACTION PRODUCTS VIA REACTIVE CONCENTRATE

[75] Inventors: Sterling B. Brown, Schenectady, N.Y.; Choong Y. Han, Evansville; James L. DeRudder, Mt. Vernon, both of Ind.; Leonard R. Hepp, Pittsfield, Mass.

[73] Assignee: General Electric Company, Schenectady, N.Y.

[21] Appl. No.: 184,534

[22] Filed: Apr. 21, 1988

Related U.S. Application Data

[63] Continuation-in-part of Ser. No. 43,074, Apr. 27, 1987, abandoned.

[51] Int. Cl.[4] .............................................. C08L 67/02
[52] U.S. Cl. .................................................... 525/438
[58] Field of Search ......................................... 525/438

[56] References Cited

U.S. PATENT DOCUMENTS 4,141,882  2/1979  Kodama et al. .................... 525/438

FOREIGN PATENT DOCUMENTS 50-96648  7/1975  Japan .
53-106749  9/1978  Japan .
56-116749  12/1981  Japan .

OTHER PUBLICATIONS

Billmeyer, *Textbook of Polymer Science,* (John Wiley & Sons, 1971), p. 258.

*Primary Examiner*—Patricia Short
*Attorney, Agent, or Firm*—William H. Pittman; James C. Davis, Jr.

[57] ABSTRACT

Branched polyester compositions having high melt viscosities, especially under conditions of low shear, are prepared in a two-step method. The first step is the reaction of a linear polyester, polycarbonate or polyester-polycarbonate containing free carboxylic acid groups with a polyfunctional epoxyalkyl compound such as triglycidyl isocyanurate to form a reactive concentrate. The second step is the reaction of said reactive concentrate with a polyester, such as poly(ethylene terephthalate) or poly(butylene terephthalate), containing a measurable proportion of carboxylic acid end groups. By this two-step method, it is possible to use less epoxy compound for a given melt viscosity level than is the case when the epoxy compound is directly blended with the polyester.

19 Claims, No Drawings

PREPARATION OF LINEAR POLYESTER-POLYEPOXIDE REACTION PRODUCTS VIA REACTIVE CONCENTRATE

This application is a continuation-in-part of application Ser. No. 043,074, filed Apr. 27, 1987, now abandoned.

This invention relates to linear polyesters, and more particularly to the preparation therefrom of branched polyesters with advantageous melt viscosity properties.

Linear polyesters, exemplified by poly(ethylene terephthalate) and poly(butylene terephthalate) (hereinafter "PET" and "PBT", respectively), are in wide industrial use for the preparation of articles by such forming methods as injection molding. Many of their properties, including chemical stability, solvent resistance and low permeability to gas, make them attractive candidates for such forming operations as blow molding, profile extrusion and thermo-forming. One problem in such operations is the relatively low melt viscosities of the polyesters, as a result of which the formed articles do not adequately retain their shape immediately after forming and before they have cooled.

One method of increasing the melt viscosity of a linear polyester, described in U.S. Pat. No. 4,590,259, is to substantially increase its molecular weight. However, this can generally be achieved only with the use of specialized equipment.

In order to maximize processability for processes that require high melt strength, such as blow molding, profile extrusion and sheet extrusion, it would be advantageous for the polyester to have low melt viscosity at high shear rates and high melt viscosity at low shear rates. For example, in blow molding low viscosity at high shear rates is desired in order to easily extrude the material, but high viscosity and high melt elasticity at low shear rates are necessary to maintain parison dimensions constant. Increasing molecular weight improves processing when high melt strength and viscosity are required at low shear rates, but has little or no effect on shear sensitivity. Thus, high molecular weight is ineffective to lower viscosity under conditions of high shear.

In recent years, polyester materials which have melt viscosities and melt strengths capable of the desired variation have been developed. For example, Japanese Kokai 81/116749 describes the reaction of poly(ether ester) elastomers with triglycidyl isocyanurate (hereinafter "TGIC") to produce a material having desirable blow molding properties. Similar treatment of PBT is described in Japanese Kokai 75/96648.

It is believed that upon treatment with a polyepoxide such as triglycidyl isocyanurate, a branched polyester is formed by reaction of the carboxylic acid end groups of the polyester with each of the epoxy groups. By reason of this branching, the polyester displays low viscosity at high shear rates, as during extrusion, and high viscosity and melt elasticity at low shear rates, as during hanging of a blow-molded parison, which insures dimensional stability. These are precisely the properties desired for such operations.

A further advantage of this reaction is that it does not require specially designed facilities for polyester production. Ordinary equipment may be employed for the preparation of conventional polyesters such as PET, PBT and elastomeric polyesters. The conventional polyester is then blended with the polyepoxide and extruded under ordinary conditions, whereupon further reaction and branching take place.

Upon further study of the reaction of polyesters with triglycidyl isocyanurate and similar polyepoxy compounds, it has been found that as the level of polyepoxide increases, melt viscosity increases to a very high level. From the standpoint of processability in normally employed equipment, the melt viscosity at the peak level may be considered infinite. At that level, therefore, the product is unworkable for purposes such as blow molding. An example of such a level is about 1-2% by weight for triglycidyl isocyanurate and a polyester having a carboxylic acid end group concentration in the range of 40-50 microequivalents per gram.

Both above and below the peak level melt viscosity decreases, rapidly at first and then more slowly. Optimum conditions for the purposes of this invention are attained at a point some distance down the steepest part of the curve, but where the absolute value of its slope is still quite high.

It is very difficult to attain that point reliably and uniformly by simply blending the polyester with the polyepoxy compound, as by melt blending using such operations as extrusion. Incomplete blending may result in regions of higher or lower melt viscosity, resulting in inhomogeneity and formation of lumps and/or regions of gel. Moreover, if the target level is missed by a relatively small value the melt viscosity may be much higher or lower than that desired and expected. One outcome may be flaw sites in the finally formed article.

Another disadvantage of simple blending is the requirement of repeated and prolonged handling of polyepoxides, some of which are irritants and/or health hazards. For example, triglycidyl isocyanurate has mutagenic properties. Contact with the body and inhalation should therefore be avoided as much as possible.

U.S. Pat. No. 4,141,882 deals by implication with the problem of near-infinite melt viscosity in compositions comprising PET and polyepoxides such as triglycidyl isocyanurate. The solution described therein is the employment of a relatively low molecular weight epoxide-reactive compound, typically a carboxylic acid such as benzoic acid. The polyepoxide and epoxide-reactive compound may be simultaneously blended with the polyester, but are preferably preblended to form a "modifier" which is in turn blended with the polyester.

For various reasons, this solution frequently proves unsatisfactory. In the first place, the reaction of a low molecular weight epoxide-reactive compound with a polyepoxide proceeds statistically rather than selectively, so that some proportion of the polyepoxide molecules will have all their epoxy groups consumed while others will remain totally unreacted; this causes non-uniformity and consequent unpredictability in the morphology of the final product. In the second place, polyepoxide which has reacted with the epoxide-reactive compound has thus been at least partially inactivated, meaning that even in the best morphological situation more polyepoxide is required than if no such epoxide-reactive compound were employed. In the third place, a substantial proportion of the polyepoxide will be converted by reaction into an epoxide compound of lower functionality which operates only to endcap the polyester or extend the chains thereof. Thus, the best result is an increase in molecular weight alone, which is of limited value for reasons previously stated.

Other problems are also encountered when low molecular weight epoxide-reactive compounds are employed. For example, the problems in handling the polyepoxide and blending it in useful proportion with the polyester are not addressed in any useful sense by partial reaction with another low molecular weight compound. Also, the use of such epoxide-reactive compounds as benzoic acid in proportions at the high end of the disclosed range may cause color formation in the polyester, which is undesirable in certain applications.

The present invention provides an improved method for the preparation of linear polyester-polyepoxide compositions which may be converted to branched polyesters with favorable melt viscosity properties. Said method facilitates production of homogeneous materials free from potential flaw sites, and minimizes body contact with irritants and potentially harmful chemicals. It also minimizes usage of polyepoxide and the proportion thereof which will provide the desired melt viscosity properties. Finally, it includes novel compositions which are capable of conversion to essentially colorless branched polyesters having the desired properties.

In one of its aspects, the present invention is a method for preparing a branched polymer which comprises the steps of:

(I) forming a reactive concentrate by effecting reaction between (A) at least one poly(O- or N-epoxyalkyl-substituted) cyclic amide, iide or imidate with (B) at least one linear polymer having substantial proportions of at least one of ester and carbonate structural units and a measurable proportion of free carboxylic acid groups, and (II) melt blending said concentrate with (C) at least one linear polyester having a substantial proportion of free carboxylic acid groups;

the proportion of reagent A employed in step I being at least about 3 parts by weight per 100 parts of reagent B, and about 0.1–3.0 parts per 100 parts of the total of reagents B and C.

Reagent A used in the method of this invention is at least one poly(O- or N-epoxyalkyl-substituted) cyclic amide, imide or imidate, usually containing one non-epoxy cyclic moiety although compounds with linked or fused moieties are also contemplated. It is most often a compound in which the epoxyalkyl group is bonded directly to the oxygen or nitrogen atom; however, compounds containing intervening structure, such as 2-carboglycidyloxyethyl compounds, may also be used. The presence of more than one epoxy group per molecule is essential. At least three of such groups are highly preferred, with three and only three being especially preferred, by reason of the ease of preparation therefrom of branched polyesters with a minimum of crosslinking and resulting gel formation.

Illustrative cyclic nuclei which may be present in reagent A are the triazine, barbiturate, hydantoin, uracil, pyromellitic diimide, piperazinedione and parabanate ring systems. As previously noted, the epoxy-containing functionalities may be present as substituents on oxygen or nitrogen atoms therein, with nitrogen atoms frequently being preferred. The most suitable compounds are triazine derivatives including triglycidyl cyanurate and TGIC. TGIC is particularly preferred by reason of its availability and particular suitability for the formation of branched polyesters. It has the formula

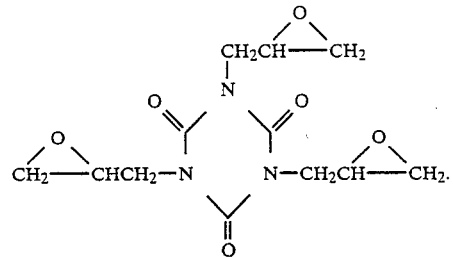

In step I of the method of this invention, a reactive concentrate is formed by the reaction of reagent A with (B) at least one linear polymer having substantial proportions (generally at least 40 and preferably 75–100 mole percent) of at least one of ester and carbonate structural units and also having free carboxylic acid groups as described hereinafter. It is apparent that this reagent may be a polyester, a polycarbonate, a polyester-polycarbonate or a copolyester or copolycarbonate with other structural units, provided the carboxylic acid end groups are present as described hereinafter. Linear polyesters are preferred. They may be crystalline or amorphous and are preferably crystalline.

The ester structural units in reagent B typically have the formula

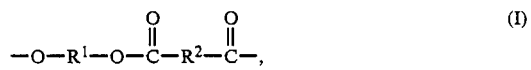

wherein each $R^1$ is independently a divalent aliphatic, alicyclic or aromatic radical containing about 2–10 carbon atoms and each $R^2$ is independently a divalent aliphatic, alicyclic or aromatic radical containing about 2–10 and usually about 6–10 carbon atoms. Polyesters containing such units may be prepared by the known reaction of dihydroxy compounds with dicarboxylic acids or functional derivatives thereof such as anhydrides, acid chlorides or lower alkyl (especially methyl) esters, preferably the esters.

The $R^1$ radicals may be one or more aliphatic or alicyclic hydrocarbon radicals containing about 2–10 carbon atoms, alicyclic radicals being known to those skilled in the art to be equivalent to aliphatic radicals for the purposes of the invention. They are most often derived from aliphatic or alicyclic dihydroxy compounds such as ethylene glycol, 1,4-butanediol, propylene glycol, 1,3-propanediol, 1,6-hexanediol, 1,10-decanediol, 1,4-cyclohexanedimethanol and 2-butene-1,4-diol. Aromatic dihydroxy compounds, especially bisphenols such as bisphenol A, may also be employed. The $R^1$ radicals may also contain substituents which do not substantially alter the reactivity of the dihydroxy compound (e.g., alkoxy, halo, nitrile) or hetero atoms (e.g., oxygen or sulfur). The aliphatic and alicyclic $R^1$ radicals are usually saturated.

The $R^2$ radicals may be derived from such acids as succinic, adipic, maleic, isophthalic and terephthalic acids or similar substituted and hetero atom-containing acids.

Also contemplated are polymers in which at least a portion of the $R^1$ and/or $R^2$ values are soft segment radicals such as poly(oxyethylene) or poly(oxybutylene). Such polymers may be prepared by incorporating compounds such as polyethylene glycol, caprolactone or dicarboxylic acids containing polyoxyalkylene segments in the polymerization reaction, and are typically elastomeric. Illustrative polyesters of this type are available from DuPont and General Electric under the trade names HYTREL and LOMOD, respectively.

Preferably, $R^1$ and $R^2$ are hydrocarbon radicals, typically containing about 2-10 and preferably 2-6 carbon atoms. Most often, $R^1$ is aliphatic and $R^2$ is aromatic. The polymer is most desirably a poly(alkylene terephthalate), particularly PET or PBT and especially the latter. It usually has a number average molecular weight of at least about 4000, preferably in the range of about 10,000-70,000, as determined by gel permeation chromatography or by intrinsic viscosity (IV) at 30° C. in a mixture of 60% (by weight) phenol and 40% 1,1,2,2-tetrachloroethane.

Polycarbonates are also useful as reagent B. They typically contain structural units of the formula $$O-A^1-O-\underset{\underset{O}{\|}}{C}-, \quad (II)$$

wherein $A^1$ is an aromatic radical. Suitable $A^1$ values include m-phenylene, p-phenylene, 4,4'-biphenylene, 2,2-bis(4-phenylene)propane, 2,2-bis(3,5-dimethyl-4-phenylene)propane and similar radicals such as those which correspond to the dihydroxyaromatic compounds disclosed by name or formula (generic or specific) in U.S. Pat. No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $A^1$ radicals are hydrocarbon radicals.

The $A^1$ radicals preferably have the formula $$-A^2-Y-A^3- \quad (III)$$

wherein each of $A^2$ and $A^3$ is a divalent monocyclic aromatic radical and Y is a bridging radical in which one or two atoms separate $A^2$ from $A^3$. The free valence bonds in formula III are usually in the meta or para positions of $A^2$ and $A^3$ in relation to Y. Such $A^1$ values may be considered as being derived from bisphenols of the formula $HO-A^2-Y-A^3OH$. Frequent reference to bisphenols will be made hereinafter, but it should be understood that $A^1$ values derived from suitable compounds other than bisphenols may be employed as appropriate.

In formula III, the $A^2$ and $A^3$ values may be unsubstituted phenylene or substituted derivatives thereof, illustrative substituents (one or more) being alkyl, halo (especially chloro and/or bromo), nitro, alkoxy and the like. Unsubstituted phenylene radicals are preferred. Both $A^2$ and $A^3$ are preferably p-phenylene, although both may be o-or m-phenylene or one o- or m-phenylene and the other p-phenylene.

The bridging radical, Y, is one in which one or two atoms, preferably one, separate $A^2$ from $A^3$. It is most often a hydrocarbon radical and particularly a saturated radical such as methylene, cyclohexylmethylene, 2-[2.2.1]bicycloheptylmethylene, ethylene, 2,2-propylene, 1,1-(2,2-dimethylpropylene), 1,1-cyclohexylene, 1,1-cyclopentadecylene, 1,1-cyclododecylene or 2,2-adamantylene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone.

For reasons of availability and particular suitability for the purposes of this invention, the preferred radical of formula II is the 2,2-bis(4-phenylene)propane radical, which is derived from bisphenol A and in which Y is isopropylidene and $A^2$ and $A^3$ are each p-phenylene.

Polyester-polycarbonates may also be used as component B. They are typically obtained by the reaction of at least one dihydroxyaromatic compound with a mixture of phosgene and at least one dicarboxylic acid chloride, especially isophthaloyl chloride, terephthaloyl chloride or both. Such polyester-polycarbonates contain structural units of formula II combined with units of formula I.

For the purposes of this invention, it is essential that component B have a measurable proportion of free carboxylic acid groups, as determined by titration. In the case of polyesters and polyester-polycarbonates, these will usually be end groups, and their concentration is conventionally measured as microequivalents per gram.

In the case of polycarbonates, carboxylic acid groups are frequently present as substituents on structural units derived from carboxylated bisphenols, as disclosed, for example, in U.S. Pat. No. 4,562,242, the disclosure of which is incorporated by reference herein. It is also possible, however, to prepare carboxylic acid-terminated polycarbonates by conventional interfacial polycarbonate methods employing a hydroxybenzoic acid or ester thereof as a chain termination agent, followed if appropriate by hydrolysis of the terminal ester groups. This method and the compositions prepared thereby are disclosed and claimed in copending, commonly owned application Ser. No. 109,873 filed Oct. 19, 1987, now U.S. Pat. No. 4,853,458.

For the most part, a carboxylic acid group concentration in the range of about 5-250 microequivalents per gram is suitable. Polyesters may degrade to some extent on extrusion, increasing the concentration of such end groups which is available for reaction. It is, however, often preferred to employ polyesters having a carboxylic acid end group concentration in the range of about 10-100, especially about 30-100 and preferably about 40-80 microequivalents per gram.

The proportion of reagent A in the reactive concentrate, especially when reagent A is TGIC and reagent B is PBT, is at least about 3 and preferably about 3-20 parts by weight per 100 parts of reagent B.

The preparation of the reactive concentrate may be effected in solution or in the melt. Melt reactions, typically involving extrusion, are generally preferred since they may be conveniently conducted in readily available equipment. Typically, reagents A and B are dry blended and are then extruded at temperatures in the range of about 200°-300° C.

The reactive concentrate produced in step I is believed to comprise principally endcapped polyester, with a typical molecule thereof having two epoxide-functionalized end groups. Minor proportions of chain-extended polyester may also be present, as a result of reaction of at least two moles of polyester with one mole of polyepoxy compound. The concentrate is not believed to be significantly branched, and is similar in appearance and in many physical properties to the resin used as reagent B. No obvious indicia of phase separation are observed therein.

The relevant physical properties of the concentrate are dominated by the polyester chains and are influenced very little by the epoxide-functionalized end groups. Consequently, said concentrate is highly compatible with unreacted polyester, yielding improved dispersion of the concentrate in step II described hereinafter.

The concentrate is dust-free, and skin contact with and inhalation of reagent A are easily avoided. It may be readily pelletized for easy handling. By the preparation of (for example) one batch of said concentrate, continued or repeated handling of reagent A in high concentration is made unnecessary.

In view of the much higher concentration of reagent A employed in preparation of the concentrate than in preparation of the blends of the prior art, it is unexpected that said concentrates are so similar in properties to the polyesters used in their preparation.

In step II, the reactive concentrate prepared in step I is melt blended with at least one linear polyester having a measurable proportion (as previously defined) of free carboxylic acid groups. The polyesters described hereinabove with respect to reagent B are also suitable for use as reagent C; in fact, it is generally preferred for reagents B and C to be the same polyester. However, another advantage of the invention is the ability to tailor the product by such expedients as employing PBT as reagent B and PET as reagent C.

The melt blending conditions employed in step II are generally identical to those employed in step I when it is effected in the melt. The proportions of reactive concentrate and reagent C, especially when reagent A is TGIC and reagents B and C are both PBT, are such as to provide, in a formal sense, about 0.1–3.0 parts and preferably about 0.4–0.6 part of reagent A per 100 parts of reagents B and C combined. (Of course, reagent A as such is not present—at least not in these proportions—in step II since a significant proportion thereof has reacted with reagent B.)

The method of this invention is frequently conveniently effected by dry blending the reactive concentrate with reagent C to form an intimate solid blend which is then melt processed as previously described. By reason of the uniformity and relatively low concentration of epoxide groups in the reactive concentrate, it is easy to "fine-tune" the concentration of such groups in the blend with reagent C, optimizing further reaction and attainment of the desired melt viscosity.

Accordingly, another aspect of the invention is a composition comprising a blend of the previously described reactive concentrate and reagent C, reagent A being employed therein in the amount of about 0.1–3.0 parts by weight per 100 parts of the total of reagents B and C.

Other materials which are chemically substantially inert may be blended into the compositions prepared by the method of this invention, at any appropriate stage of blending and especially during step II. Such materials include fillers, reinforcing materials, flame retardants, pigments, dyes, stabilizers, anti-static agents, mold release agents and impact modifying polymers, the latter being exemplified by core-shell polymers having a core comprising alkyl acrylate, diene and/or styrene units and a shell comprising alkyl methacrylate units.

The viscosity properties of polyester-TGIC compositions are illustrated by a series of experiments in which the polyester employed was the PBT described hereinafter in Example 1. Table I lists melt viscosities and intrinsic viscosities (in the above-identified phenol-tetrachloroethane mixture) of the original PBT, extruded PBT and various PBT-TGIC mixtures prepared by dry blending and extrusion, also as described in Example 1.

TABLE I

| Parts TGIC per 100 parts PBT | Melt visc., poises $\times 10^2$ | IV, dl./g. |
|---|---|---|
| 0 (untreated PBT) | 75 | 1.15 |
| 0 (extruded PBT) | 55* | — |
| 0.2 | 126 | — |
| 0.4 | 314 | — |
| 0.6 | 1579 | — |
| 1.0 | ** | 1.36 |
| 3.0 | 146 | 1.18 |
| 4.0 | 104 | — |
| 5.0 | 60 | 1.11 |
| 6.0 | 70 | — |
| 7.0 | 39 | 1.07 |
| 10.0 | 22 | 1.00 |
| 20.0 | 20 | — |

*Average value.
**Did not flow.

From the table, it is apparent that a substantial increase in melt viscosity, accompanied by a modest increase in intrinsic viscosity, is exhibited upon increase of the TGIC proportion to a value on the order of 1–2 parts per 100 parts of PBT. At 3.0 parts of TGIC and above, the melt viscosity drops rapidly, reaching essentially the value of PBT in the range of 5–7 parts and dropping even lower as the TGIC concentration is further increased. Thus, the preparation of concentrates in accordance with step I of this invention affords materials having properties which most resemble those of unreacted PBT, as opposed to blends containing TGIC in smaller proportions which have materially higher melt viscosities.

The conditions of step II provide excellent dispersion of the reactive concentrate in reagent C, insuring a high and uniform degree of branching throughout the composition and minimizing undesirable gel formation. The compositions thus obtained generally exhibit much lower melt viscosities than those listed in Table I when subjected to high shear. Thus, they may be conveniently extruded for purposes such as blow molding and profile extrusion. Said compositions also generally have higher melt viscosities after extrusion than blends of neat TGIC with polyesters in the same proportions, and frequently exhibit other beneficial properties as compared with unmodified polyesters, particularly higher impact strength and improved ductility.

The method of this invention is illustrated by the following examples.

EXAMPLE 1

A PBT having a number average molecular weight (as determined by gel permeation chromatography) of about 50,000 and a carboxylic acid end group concentration of about 45 microequivalents per gram was dried for 4 hours at 120° C. in a circulating air oven and was then dry blended with TGIC in various proportions and extruded on a twin screw extruder at 400 rpm. and 266° C. The extrudates, which were the desired reactive concentrates, were quenched in water, pelletized and redried. They were then dry blended with further PBT and extruded under similar conditions.

The relevant proportions and melt viscosities are given in Table II. Melt viscosities were determined at 250° C. on a Tinius-Olsen melt plastometer.

TABLE II

| Parts TGIC per 100 parts PBT | | Blend melt visc., |
|---|---|---|
| Concentrate | Blend | poises × 10² |
| 20 | 0.5 | 371 |
| 6 | 0.4 | 281 |
| 5 | 0.4 | 356 |
| 4 | 0.4 | 368 |
| 3 | 0.4 | 378 |

EXAMPLE 2

Following the procedure of Example 1, the further concentrates and blends listed in Table III were prepared from the same PBT.

TABLE III

| Parts TGIC per 100 parts PBT | |
|---|---|
| Concentrate | Blend |
| 3.0 | 0.4 |
| 4.3 | 0.53 |
| 5.0 | 0.6 |
| 5.3 | 0.51 |
| 6.3 | 0.5 |
| 7.5 | 0.5 |
| 11.1 | 0.5 |
| 25.0 | 0.5 |

EXAMPLE 3

The procedure of Example 1 was repeated, replacing the PBT in step II with a commercially available PET (Grade 5202A available from Rohm & Haas Company). The results are given in Table IV. Melt viscosity measurements were made at 265° C.

TABLE IV

| Parts TGIC per 100 parts polyester | | Blend melt visc., |
|---|---|---|
| Concentrate | Blend | poises × 10² |
| 0 | 0* | 14.6 |
| 0 | 0** | 13.2 |
| 10 | 0.5 | 39.8 |
| 20 | 1.0 | 47.4 |

*Untreated PET.
**Extruded PET.

EXAMPLES 4–6

Following the procedure of Example 1, TGIC-containing concentrates were prepared using the following polymers as reagent B:

Example 4 —"KODAPAK 7352", a commercially available PET having an intrinsic viscosity of 0.74 dl./g.
Example 5 —"CLEARTUF 1006B", a commercially available PET having an intrinsic viscosity of 1.04 dl./g.
Example 6 —"HYTREL 4056", an elastomeric polyester commercially available from DuPont.

Said concentrates were then blended with the PBT of Example 1 and the blends were extruded under the conditions employed in that example. The melt viscosities of the products were compared with those of controls comprising polyester blends from which the TGIC was absent. The relevant parameters and test results are given in Table V.

TABLE V

| | Concentrate | | Blend | |
|---|---|---|---|---|
| Example | Parts TGIC per 100 parts polymer | Extrusion temp., °C. | Parts TGIC per 100 parts polymer | Melt viscosity poises × 10² |
| | | | | Product | Control |
| 4 | 5.3 | 271 | 0.5 | 422 | 95 |
| 5 | 5.3 | 266 | 0.5 | — | — |
| 6 | 11.1 | 210 | 0.5 | 392 | 70 |

What is claimed is:

1. A method for preparing a branched polymer which comprises the steps of:
   (I) forming a reactive concentrate by effecting reaction between the constituents of a mixture consisting essentially of (A) at least one poly(O- or N-epoxyalkyl-substituted) cyclic amide, imide or imidate with (B) at least one linear polymer having substantial proportions of at least one of ester and carbonate structural units, a number average molecular weight of at least about 4000 and a measurable proportion of free carboxylic acid groups, and
   (II) melt blending said concentrate with (C) at least one linear polyester having a substantial proportion of free carboxylic acid groups;
   the proportion of reagent A employed in step I being at least about 3 parts by weight per 100 parts of reagent B, and about 0.1–3.0 parts per 100 parts of the total of reagents B and C.

2. A method according to claim 1 wherein reagent A contains a single triazine, barbiturate, hydantoin, uracil, pyromellitic diimide, piperazinedione or parabanate moiety and the epoxyalkyl groups therein are bonded directly to oxygen or nitrogen atoms.

3. A method according to claim 2 wherein reagent B is a polyester, polycarbonate or polyester-polycarbonate.

4. A method according to claim 3 wherein reagent A is triglycidyl isocyanurate.

5. A method according to claim 4 wherein reagent B is a linear polyester comprising structural units of the formula

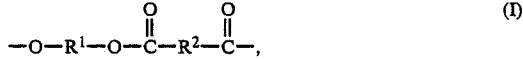

$$-O-R^1-O-\overset{O}{\underset{\|}{C}}-R^2-\overset{O}{\underset{\|}{C}}-, \qquad (I)$$

wherein each $R^1$ is independently a divalent aliphatic, alicyclic or aromatic radical containing about 2–10 carbon atoms and $R^2$ is a divalent aromatic radical containing about 6–10 carbon atoms.

6. A method according to claim 5 wherein reagent C is a poly(ethylene terephthalate) or a poly(butylene terephthalate) having a carboxylic acid end group concentration in the range of about 10–100 microequivalents per gram.

7. A method according to claim 6 wherein step I is effected in the melt.

8. A method according to claim 6 wherein reagents B and C are identical, each $R^1$ is ethylene or tetramethylene and each $R^2$ is p-phenylene.

9. A method according to claim 8 wherein the proportion of reagent A is about 3–20 parts per 100 parts of reagent B and about 0.4–0.6 part per 100 parts of the total of reagents B and C.

10. A method according to claim 9 wherein reagents B and C are each a poly(butylene terephthalate) having a carboxylic acid end group concentration in the range of about 40–80 microequivalents per gram.

11. A composition comprising a blend of:
the reaction product of a mixture consisting essentially of (A) at least one poly (O- or N-epoxyalkyl-substituted) cyclic amide, imide or imidate with (B) at least one linear polymer having substantial proportions of at least one of ester and carbonate structural units, a number average molecular weight of at least about 4000 and a measurable proportion of free carboxylic acid groups, the proportion of reagent A being at least about 3 parts by weight per 100 parts of reagent B; and (C) at least one linear polyester having a substantial proportion of free carboxylic acid groups;

wherein reagent A is employed in the amount of about 0.1–3.0 parts per 100 parts of the total of reagents B and C and the weight ratio of component C to the reaction product of components A and B is at least 7.5:1.

12. A composition according to claim 11 wherein reagent A contains a single triazine, barbiturate, hydantoin, uracil, pyromellitic diimide, piperazinedione or parabanate moiety and the epoxyalkyl groups therein are bonded directly to oxygen or nitrogen atoms.

13. A composition according to claim 12 wherein reagent B is a polyester, polycarbonate or polyester-polycarbonate.

14. A composition according to claim 13 wherein reagent A is triglycidyl isocyanurate.

15. A composition according to claim 14 wherein reagent B is a linear polyester comprising structural units of the formula

wherein each $R^1$ is independently a divalent aliphatic, alicyclic or aromatic radical containing about 2–10 carbon atoms and $R^2$ is a divalent aromatic radical containing about 6–10 carbon atoms.

16. A composition according to claim 15 wherein reagent C is a poly(ethylene terephthalate) or a poly(butylene terephthalate) having a carboxylic acid end group concentration in the range of about 10–100 microequivalents per gram.

17. A composition according to claim 16 wherein reagents B and C are identical, each $R^1$ is ethylene or tetramethylene and each $R^2$ is p-phenylene.

18. A composition according to claim 17 wherein the proportion of reagent A is about 3–20 parts per 100 parts of reagent B and about 0.4–0.6 part per 100 parts of the total of reagents B and C.

19. A composition according to claim 18 wherein reagents B and C are each a poly(butylene terephthalate) having a carboxylic acid end group concentration in the range of about 40–80 microequivalents per gram.

* * * * *